United States Patent
Dick

[11] Patent Number: 6,145,685
[45] Date of Patent: Nov. 14, 2000

[54] COMBINATION CONTAINER

[75] Inventor: Roderick Antonio Dick, Los Angeles, Calif.

[73] Assignee: Surluster Inc., Los Angeles, Calif.

[21] Appl. No.: 09/361,084

[22] Filed: Jul. 26, 1999

[51] Int. Cl.[7] ............................................. B65D 21/02
[52] U.S. Cl. .................... 220/23.88; 220/23.91; 220/592.23; 220/504; 215/6; 215/10
[58] Field of Search ................ 220/504, 592.23, 220/23.91, 23.88, 23.89, 23.87, 23.86, 23.83, 521, 522, 524, 916; 215/6, 10; 206/549.5

[56] References Cited

U.S. PATENT DOCUMENTS

| | | | |
|---|---|---|---|
| 3,465,905 | 9/1969 | Schottanes | 215/6 |
| 3,744,622 | 7/1973 | Weaver | 206/543 |
| 4,078,686 | 3/1978 | Karesh | 215/6 |
| 4,720,351 | 1/1988 | Flynn et al. | 215/6 |
| 4,951,832 | 8/1990 | Tenney et al. | |
| 5,086,926 | 2/1992 | Paige et al. | |
| 5,417,327 | 5/1995 | Saumure | |
| 5,630,523 | 5/1997 | Wright | |
| 5,803,268 | 9/1998 | Levy et al. | |
| 5,848,700 | 12/1998 | Horn | 206/570 |
| 5,941,394 | 8/1999 | Siegler | 206/571 |

*Primary Examiner*—Stephen Castellano
*Attorney, Agent, or Firm*—Koda & Androlia

[57] ABSTRACT

A container comprising a main container and at least one sub-container stored in the main container. The opening of the sub-container is closed by a cap, and this cap is also used so as to close the opening of main container with the sub-container attached to the cap inside the main container. The main container, preferably a hollow cylinder, may have both ends opened, so that two sub-containers are stored therein so that each one of the two sub-containers is closed by separate caps and the separate caps to which the two sub-containers attached are then mounted to the open ends of the main container, thus closing the open ends. The exteriors of the caps may be differently marked so that, for instance, the order of use of the contents of the two sub-containers is indicated to a user.

9 Claims, 4 Drawing Sheets

COMBINATION CONTAINER

BACKGROUND OF THE INVENTION

1. Field of the Invention

The present invention relates to a container and more particularly to a container that is a combination of a main container and internal containers stored in the main container.

2. Prior Art

Many different types of containers have been designed, marketed and used for the purposes of storing and transferring products, and other purposes. Some containers are designed so that they are convenient for carrying an item to different places and some containers are designed so that they are convenient for carrying different items all together at the same time.

Containers of the latter type come in different kinds. One kind of container is disclosed in U.S. Pat. No. 5,086,926 issued on Feb. 11, 1992 to Paige et al. In this container, which is for a dual THERMOS, a first THERMOS assembly, a spacer assembly, a second THERMOS assembly, a bowl assembly and a cup assembly are vertically combined into a single piece by being screw-engaged with one on the other. Thus, though this prior art shows a plurality of different containers assembled into a single piece, these containers are merely put one on the other in an over/under configuration, and therefore, it provides no teaching of reducing the size after assembly.

It is also indeed generally known to use a larger container to store a smaller container(s) therein. Since, however, the cover of the smaller container cannot be used for the larger container, and the cover of the larger container cannot be used for the smaller container, each of the larger and smaller containers requires its own cover for storing contents inside.

SUMMARY OF THE INVENTION

Accordingly, the main object of the present invention is to provide a container that can store another container(s) therein.

It is another object of the present invention to provide a container which is a combination of a main container and internal containers that are stored in the main container with covers that are used for closing the openings of the main container and the openings of the internal containers.

It is a further object of the present invention to provide a container that is formed with guide markings that is indicative of, for instance, the order of the covers to be opened upon the use of the contents of the internal containers.

It is still another object of the present invention to provide a container that is simple and pleasing in appearance.

The above objects are accomplished by a unique structure for a container of the present invention that comprises a cylindrical hollow main container, at least one internal container that is stored inside the main container, and a cover(s) that cover(s) the opening(s) of the main container as well as the opening(s) of the internal container(s).

In other words, according to the container of the present invention, the covering means for covering the main container is provided with an engaging means for engaging the internal container(s), so that the covering means not only covers and closes the main container but also covers and closes the internal container(s).

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
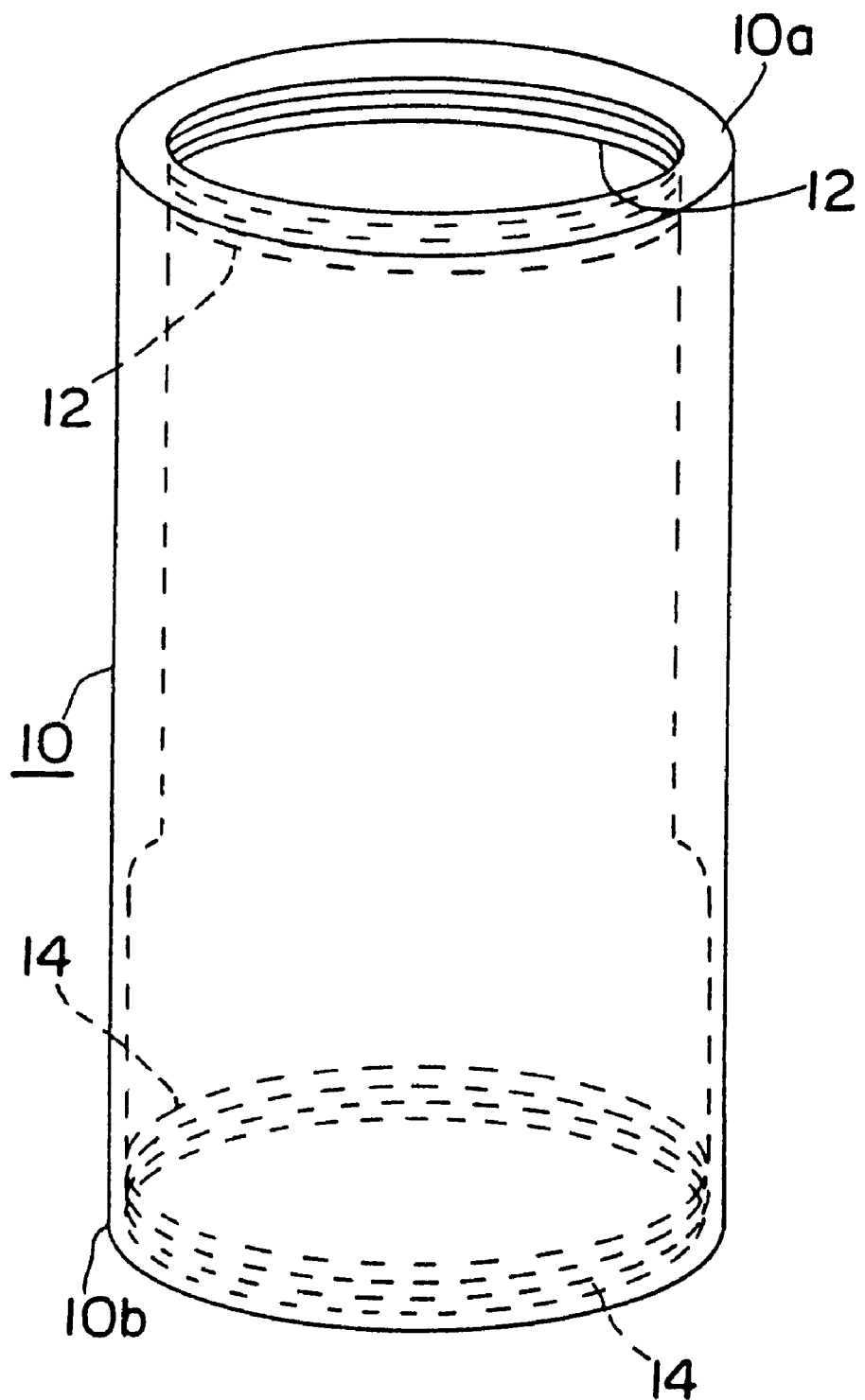
FIG. 1 shows the main container according to one embodiment of the present invention.
Figure 2:
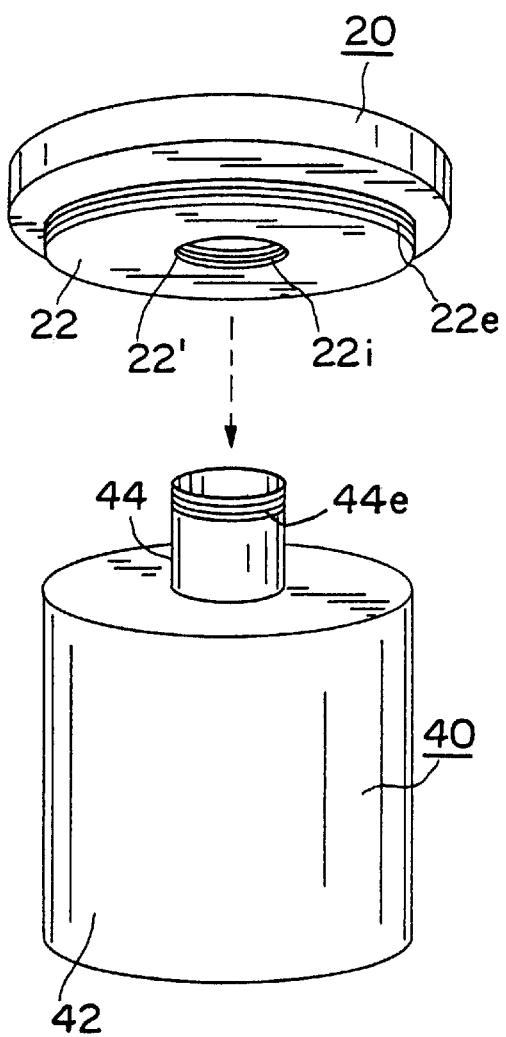
FIG. 2 shows the first cover and the first internal container that is covered by the first cover.
Figure 3:
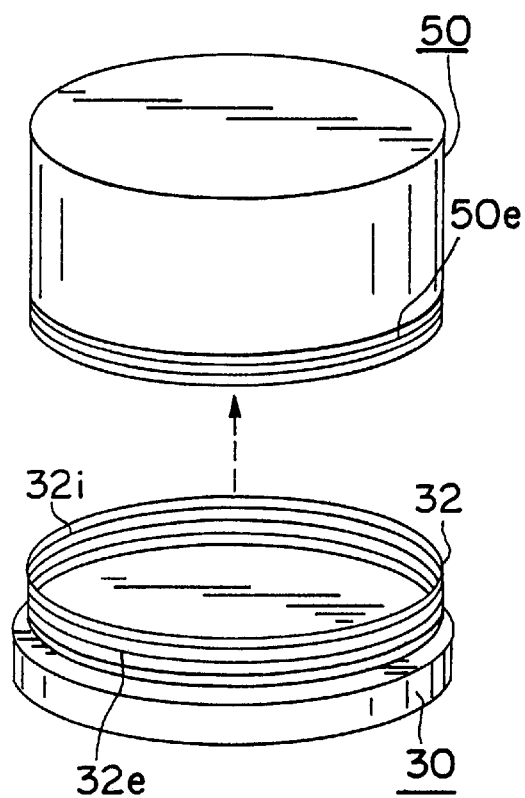
FIG. 3 shows the second cover and the second internal container that is covered by the second cover.

As seen from FIGS. 1 through 3, the container of the present invention is comprised of a main container 10, a first cover 20, a second cover 30, a first internal container 40 and a second internal container 50.

The main container 10 of the shown embodiment in FIG. 1 is substantially a hollow cylinder with both ends 10a and 10b opened. The main container 10 is preferably made from a metallic material, preferably a rust-free metallic material, and is provided with an internal thread 12 formed on the internal peripheral surface near the upper end 10 and with another internal thread 14 formed on the internal peripheral surface near the lower end 10b.

The first cover 20 is, as seen from FIG. 2, substantially a disk made from the same metallic material as the main container 10. The first cover 20 has an outer diameter which is the same as that of the main container 10 and is provided on its one side, which faces the interior of the main container 10 when put on the main container 10, with a centrally located engaging projection 22. The engaging projection 22 is a shallow, solid cylinder and is made integral to the first cover 20, with a diameter equal to the inner diameter of the upper end 10a of the main container 10. The engaging projection 22 is formed with an external thread 22e on its peripheral surface so that the external thread 22e is screw-engageable with the internal thread 12 of the main container 10. The first cover 20, more specifically the engaging projection 22 thereof, is provided with an engagement recess 22' at the center, and an internal thread 22i is formed on the internal peripheral surface of this engagement recess 22'.

As seen in FIG. 3, the second cover 30 is also substantially a disk made from the same metallic material as the main container 10. The outer diameter of the second cover 30 is the same as that of the main container 10. Unlike the first cover 20, the second cover 30 is provided on its one side, which faces the interior of the main container 10 when put on the main container 10, with a circular rim 32. The circular rim 32 is made integral to the second cover 30 and has a diameter slightly smaller than that of the inner diameter of the lower end 10b of the main container 10. The circular rim 32 is formed with an external thread 32e on its outer peripheral surface so as to be screw-engaged with the internal thread 14 of the main container 10. Furthermore, the circular rim 32 is formed with an internal thread 32i on its inner peripheral surface.

As shown in FIG. 2, the first internal container 40 of the shown typical embodiment is an elongated bottle made of plastic. The bottom end of the main portion 42 of the first internal container 40 is closed, and a spout 44 is formed on this main portion 42. The main portion 42 of the first internal container 40 is substantially a cylinder having a diameter slightly smaller than the inner diameter of the main container 10 so that the main portion 42 is snugly received inside the main container 10. The spout 44 has an outer diameter slightly smaller than the engagement recess 22' of the first cover 20 and is formed with an external thread 44e so that the external thread 44e is screw-engageable with the internal thread 22i of the first cover 20.

As shown in FIG. 3, the second internal container 50 of the shown typical embodiment is a cylinder with an opening at one end and a closed bottom at another end, with substantially the same constant diameter from one end to another end. The outer peripheral surface near the opening of the second internal container 50 is provided with an external thread 50e so that the external thread 50e is screw-engageable with the internal thread 32i formed on the circular rim 32 of the second cover 30.

With the structure described above and as is shown in FIG. 4, the first internal container 40 into which one substance, for instance, a liquid form material, is filled is covered and closed with the first cover 20 by way of screw engaging the internal thread 22i of the first cover 20 with the external thread 44e formed on the spout 44 of the first internal container 40. The first internal container 40 thus closed by and attached to the first cover 20 is, as seen from FIG. 4, put in the main container 10 through the upper open end 10a as indicated by a dotted arrow A; and then the first cover 20 is turned so that the external thread 22e formed on the engaging projection 22 of the first cover 20 is screw engaged with the internal thread 12 formed on the inner peripheral surface of the upper end 10a of the main container 10. Thus, the first cover 20 attached to and closing the first internal container 40 is securely attached to the main container 10 and assuredly closes the open upper end 10a of the main container 10.

On the other hand, the second internal container 50 into which another substance, for instance, a solid form material, is filled is covered and closed with the second cover 30 by way of screw engaging the inner thread 32i of the circular rim 32 of the second cover 50 with the external thread 50e formed on the second internal container 50. The second internal container 50 thus closed by and attached to the second cover 30 is, as seen from FIG. 4, put in the main container 10 through the lower open end 10b as indicated by the dotted arrow B, and the second cover 30 is turned so that the external thread 32e of the circular rim 32 of the second cover 30 is screw-engaged with the internal thread 14 formed on the inner peripheral surface of the lower end 10b of the main container 10. Thus, the second cover 30 attached to and closing the second internal container 50 is securely attached to the main container 10 and assuredly closes the open lower end 10b of the main container 10.

As seen from the above, according to the present invention, the covers 20 and 30 are respectively used for closing the openings of the internal containers 40 and 50 as well as the openings or the open ends 10a and 10b of the main container 10 into which the internal containers 40 and 50 are stored. Thus, the internal containers do not need closing means or covers particularly designed therefor, and also the main container that stores therein the internal containers does not need closing means or covers solely designed therefor. In other words, the closing means or the covers of the present invention have a dual function for closing both the internal containers and the main container that contains therein the internal containers.

When the contents of the internal containers 40 and 50 are to be used, the first and second covers 20 and 30 are unscrewed from the main container 10, thus taking the first and second containers 40 and 50 out of the main container 10. Then, the first and second covers 20 and 30 are unscrewed from the first and second containers 40 and 50, respectively, thus allowing an access to the contents of each one of the containers 40 and 50.

Figure 4:
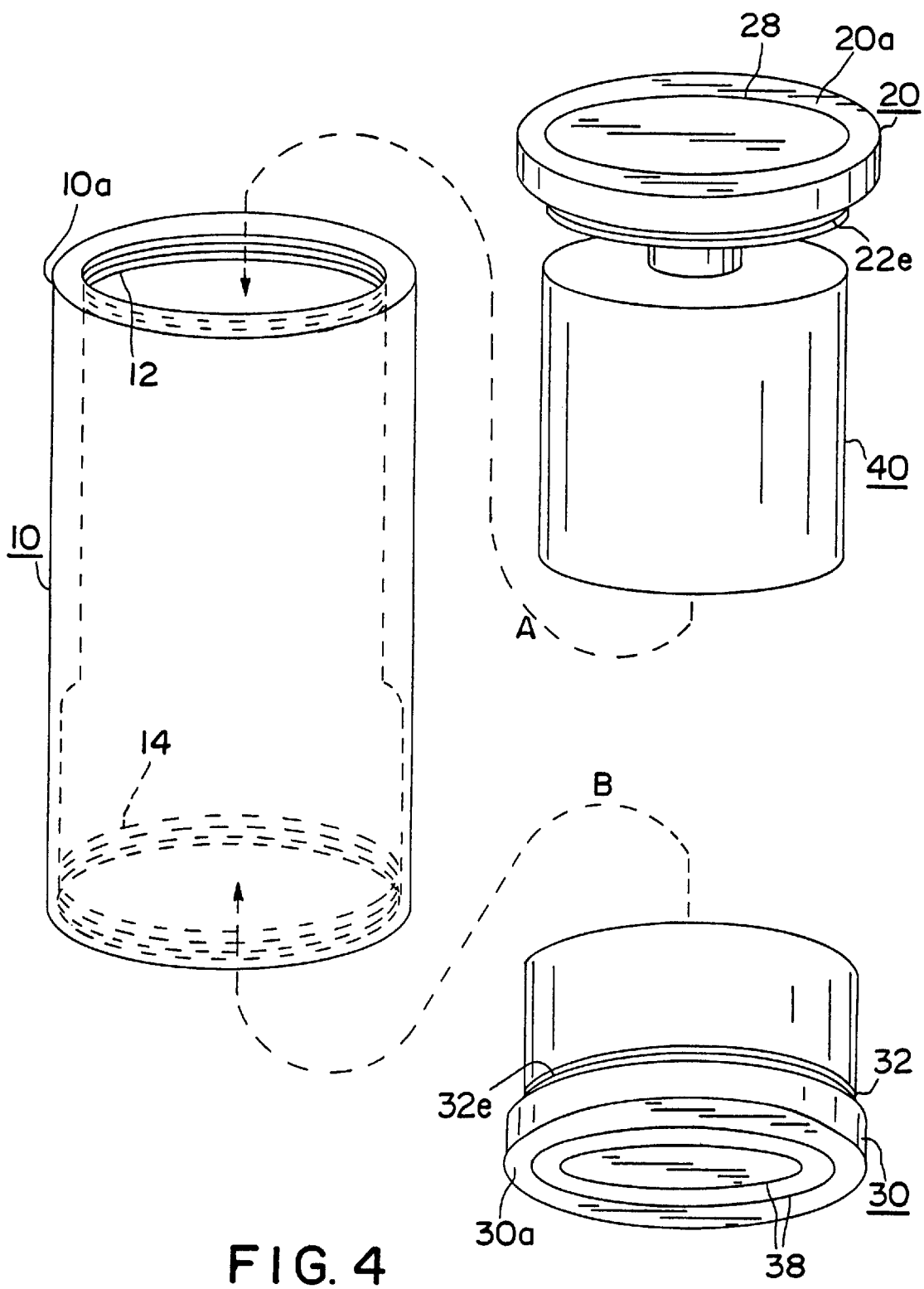
FIG. 4 is an exploded perspective view showing the manner of storing the first and second internal containers covered respectively with the first and second covers into the main container.

Furthermore, the first and second covers 20 and 30 may be formed with markings on an external side thereof, as shown in FIG. 4. In particular, the first cover 20 is engraved with a single circle 28 on its outer surface 20a, and the second cover 30 is engraved with a double circle (or two circles) 38 on its outer surface 30a. With these markings, a user can easily recognize that the first cover 20 with the single circle 28 is to be first removed from the main container 10 and then the second cover 30 with the double circles 38 is removed from the main container 10. This is particularly convenient when the first container 40 covered by the first cover 20 contains a substance that is used first in, for instance, car waxing, a pre-wax liquid cleaner, for example, and the second container 50 covered by the second cover 30 contains a substance that is used secondly, a paste wax, for example. The markings can be numbers, alphabet, or any other illustrations instead of the circle(s) as described above and indicative of the products contained in the first and second containers 40 and 50.

Depending upon the contents stored in the internal containers, an additional material can be put in the main container. For example, when the contents for the internal containers 40 and 50 are those used in car waxing, a cleaning cloth and/or a piece of sponge can be stored between these internal containers.

In the shown typical embodiment, the main container 10, the first cover 20 and the second cover 30 are all made of metal and sized about by 5½ in. long and 2¼ in. diameter when assembled so that the container as a whole has a certain weight, for instance about a pound, thus giving somewhat a weighty feeling when a user (or a consumer) have it in hand and thus showing off a feeling of high-end quality container to the user. Instead, the main container 10, the first cover 20 and the second cover 30 can be made of rubber or plastics such as, for instance, hard synthetic resins so that the covers 20 and 30 are either screw engaged with the main container 10 or elastically snap-engaged with the main container 10 so that the container as a whole is light and easy to carry.

Furthermore, in the above embodiments, the first cover 20 is provided with the engaging projection 22, and a means (the external thread 22e) for making an engagement with the main container 10 and a means (the internal thread 22i) for making an engagement with the first container 40 are both provided on the engaging projection 22; and the second cover 30 is provided with the circular rim 32, and a means (the external thread 32e) for making an engagement with the main container 10 and a means (the internal thread 32i) for making an engagement with the second container 50 are both provided on the circular rim 32. It can, however, be designed so that both the first and second covers 20 and 30 are provided with the engaging projections 22 or both the first and second covers 20 and 30 are provided with the circular rims 32; and the containers 40 and 50 are provided with corresponding engaging means.

Figure 5:
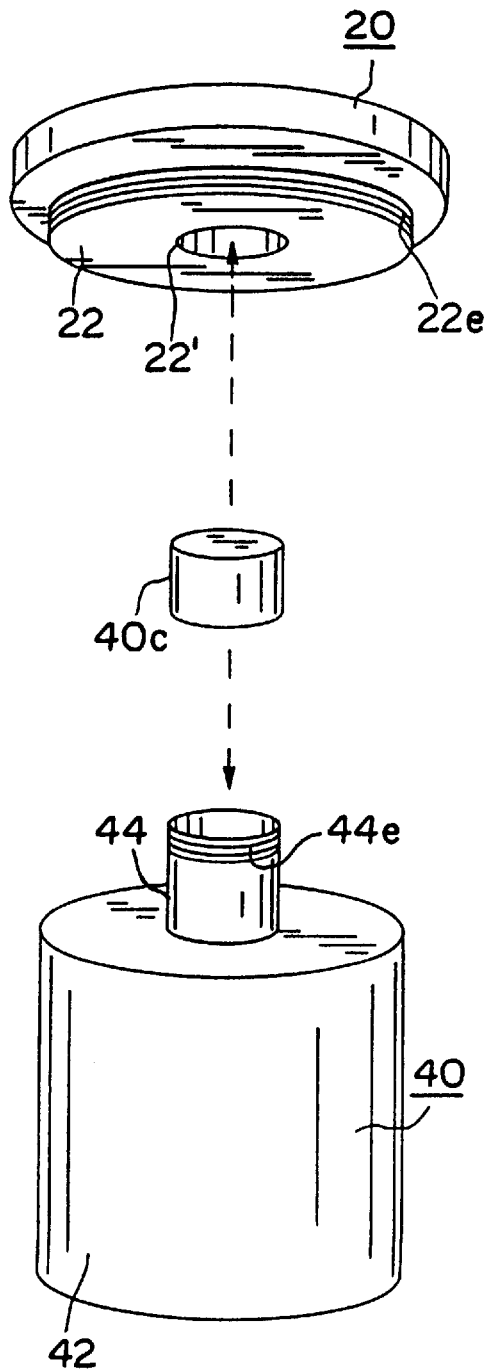
FIG. 5 shows another embodiment of the first internal container that is closed by a cap and then attached to the first cover member.
Figure 6:
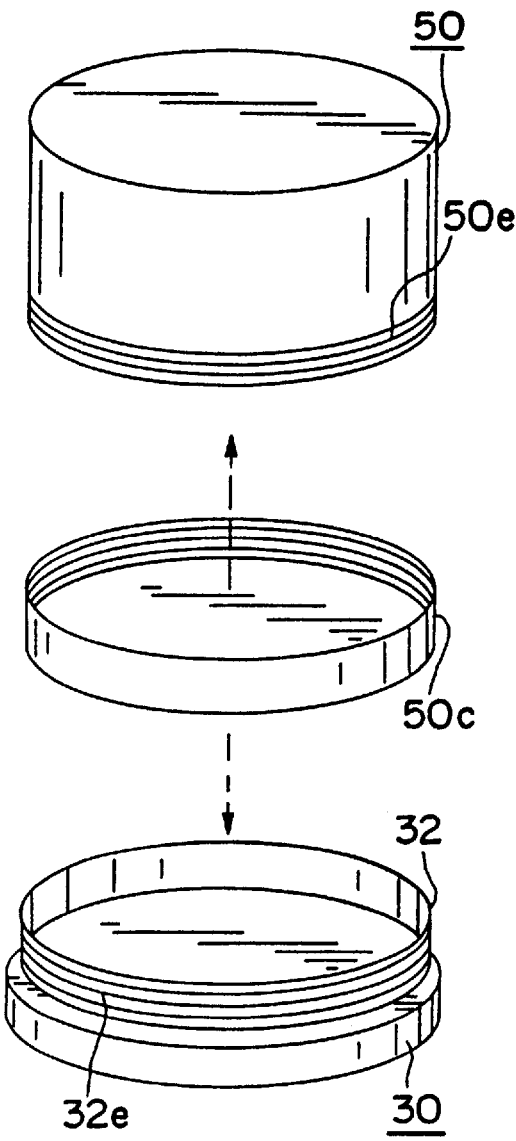
FIG. 6 shows another embodiment of the second internal container that is closed by a cap and then attached to the second cover member.

In the shown embodiment, the first internal container 40 is closed by the first cover 20. However, as shown in FIG. 5, the first internal container 40 may have its own cap 40c that is made of an elastic material and can internally screw engage or pressure engage the spout 44 of the container 40. When the first internal container 40 is closed by the cap 40c, the cap 40c to which the container 40 is attached is externally pressure engaged with the engagement hole 22' of the first cover 20, and then the first cover 20 having the first container 40 thereon is fitted on the main container 10 as shown in FIG. 4. In this case, it is not necessary that the engagement hole 22' is formed with the internal thread 22i since the cap 40c can elastically make a strong mating with the engagement hole 22' of the first cover 20. The same principle can be applied to the second cover 30 and the second internal container 50. As seen from FIG. 6, the second internal container 50 may have its own cap 50c that can internally engage (or screw-engage) the container 50 and then externally engage the second cover 30. Both containers 40 and 50 do not necessarily have caps 40c and 50c; and either one of the containers may have its own cap, and the other can be directly closed by either the first or second cover 20 or 30.

The shapes of the main container 10, the first cover 20 and the second cover 30 are not necessarily circular as shown in the accompanying drawings; and they can be in any shape, including a polygonal shape in cross section. Also, the shapes of the internal containers 40 and 50 are not limited to those as described above and shown in the accompanying drawings, and any shape can be employed as long as each of the internal containers 40 and 50 can fit entirely in the main container.

In addition, the shown embodiment is described for a container that stores two internal containers. However, the main container 10 can be designed so that one end thereof is closed, thus having only one opening. With this structure, either the first cover 20 or the second cover 30 is used to cover a single internal container of any shape of and is then mounted to the opening of the main container 10 so as to close the main container with the single internal container stored therein.

It should be understood that the invention is not limited to the embodiment illustrated and described above. Various changes can be made in the design and arrangement of elements without departing from the spirit and scope of the invention as the same will be readily understood by those skilled in the art.

What is claimed is:

1. A container comprising:

substantially a hollow cylindrical main container having an open first end and an open second end, each of said open first and second ends being provided with an internal thread formed on an inner peripheral surface thereof;

a first cover member removably mounted to said open first end of said main container so as to close said open first end;

a second cover member removably mounted to said open second end of said main container so as to close said open second end;

a first internal container having an opening, said first internal container being of the size installed inside said main container and said opening of said first internal container being closed by said first cover member; and a second internal container having an opening, said second internal container being of the size installed inside said main container and said opening of said second internal container being closed by said second cover member.

2. The container according to claim 1, wherein said first cover member is screw-engaged with said open first end of said main container via an external thread formed on said first cover member and an internal thread formed adjacent to said first end of said main container.

3. The container according to claim 1, wherein said second cover member is screw-engaged with said open second end of said main container via an external thread formed on said second cover member and an internal thread formed adjacent to said second end of said main container.

4. The container according to claim 1, wherein said first cover member is provided with a central recess on one side thereof with an internal thread formed on a peripheral surface thereof so that said opening of said first internal container is closed by said first cover member by way of a thread engagement between said internal thread of said first cover member and an external thread formed adjacent to said opening of said first internal container.

5. The container according to claim 1, wherein said second cover member is provided with a circular rim on one side thereof with an internal thread formed on an outer peripheral surface thereof so that said opening of said second internal container is closed by said second cover member by way of a thread engagement between said internal thread of said second cover member and an external thread formed adjacent to said opening of said second internal container.

6. The container according to claim 1, wherein said main container, said first cover and said second cover member are formed from a synthetic resin so that said first cover member is elastically snap engaged with said main container and with said first container, and said second cover member is elastically snap engaged with said main container and with said second container.

7. The container according to claim 1, wherein said first and second cover members are provided with markings on exterior surfaces thereof, said markings being indicative of an order of dismounting said first and second cover members from said main container.

8. The container according to claim 1, wherein said first and second cover members are provided with markings on exterior surfaces thereof, said markings being indicative of contents contained in said internal containers.

9. The container according to claim 1, wherein at least one of said first and second internal containers is provided with a cap member that closes said opening of said at least one of said first and second internal containers, said cap member being engageable with at least one of said first and second cover members.

* * * * *